US008626934B2

(12) United States Patent
Jakobsson et al.

(10) Patent No.: US 8,626,934 B2
(45) Date of Patent: Jan. 7, 2014

(54) SYSTEM AND METHOD FOR CONTROLLING ACCESS TO LEGACY PUSH PROTOCOLS BASED UPON A POLICY

(75) Inventors: Bengt-Inge Jakobsson, San Francisco, CA (US); Andreas E. Jansson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 11/434,024

(22) Filed: May 15, 2006

(65) Prior Publication Data

US 2007/0106800 A1 May 10, 2007

Related U.S. Application Data

(60) Provisional application No. 60/733,823, filed on Nov. 4, 2005.

(51) Int. Cl.
*G06F 15/16* (2006.01)
(52) U.S. Cl.
USPC ......................................................... 709/229
(58) Field of Classification Search
USPC ......................................................... 709/229
See application file for complete search history.

(56) References Cited

U.S. PATENT DOCUMENTS

| 5,440,727 | A | 8/1995 | Bhide et al. |
| 5,659,596 | A | 8/1997 | Dunn |
| 5,832,487 | A | 11/1998 | Olds et al. |
| 5,963,974 | A | 10/1999 | Arimilli et al. |
| 6,052,724 | A | 4/2000 | Willie et al. |
| 6,067,301 | A | 5/2000 | Aatresh |
| 6,134,673 | A | 10/2000 | Chrabaszcz |
| 6,208,870 | B1 | 3/2001 | Lorello et al. |
| 6,226,686 | B1 | 5/2001 | Rothschild et al. |
| 6,279,076 | B1 | 8/2001 | Shishido et al. |
| 6,292,833 | B1 | 9/2001 | Liao et al. |
| 6,304,949 | B1 | 10/2001 | Houlsdworth |
| 6,480,862 | B1 | 11/2002 | Gall |
| 6,578,076 | B1 | 6/2003 | Putzolu |
| 6,611,867 | B1 | 8/2003 | Bowman-Amuah |

(Continued)

FOREIGN PATENT DOCUMENTS

| WO | WO 02-059790 | 8/2002 |
| WO | WO 02-096057 | 11/2002 |
| WO | WO 02-102016 | 12/2002 |

OTHER PUBLICATIONS

International Search Report and Written Opinion for PCT/US07/69021 dated Jul. 25, 2008, 10 pages.

(Continued)

*Primary Examiner* — Andrew Georgandellis
(74) *Attorney, Agent, or Firm* — Fliesler Meyer LLP

(57) ABSTRACT

In accordance with embodiments, there are provided mechanisms and methods for controlling access to telecommunications resources implementing a legacy protocol based upon a policy. These mechanisms and methods for controlling access to legacy protocols based upon a policy can enable embodiments to control access by third party created and other applications to network resources implementing legacy telecommunications protocols. The ability of embodiments to control access by third party created and other applications to network resources can enable network providers to provide greater access to network resources without compromising security of other users. Embodiments may further provide the ability to interface with legacy push protocols, multimedia message protocols and short message peer-to-peer protocols.

15 Claims, 13 Drawing Sheets

(56) References Cited

U.S. PATENT DOCUMENTS

| | | | |
|---|---|---|---|
| 6,621,793 B2 | 9/2003 | Widegren et al. | |
| 6,625,751 B1 | 9/2003 | Starovic et al. | |
| 6,629,260 B1 | 9/2003 | Dancer et al. | |
| 6,701,519 B1 | 3/2004 | Cowan | |
| 6,704,933 B1 | 3/2004 | Tanaka et al. | |
| 6,708,206 B1 * | 3/2004 | Thrane et al. | 709/219 |
| 6,721,286 B1 | 4/2004 | Williams et al. | |
| 6,747,970 B1 | 6/2004 | Lamb et al. | |
| 6,801,604 B2 | 10/2004 | Maes et al. | |
| 6,823,477 B1 | 11/2004 | Cheng et al. | |
| 6,862,689 B2 | 3/2005 | Bergsten et al. | |
| 6,888,828 B1 | 5/2005 | Partanen et al. | |
| 6,961,776 B1 | 11/2005 | Buckingham et al. | |
| 6,965,777 B1 | 11/2005 | Cast et al. | |
| 6,988,133 B1 | 1/2006 | Zavalkovsky et al. | |
| 7,039,037 B2 * | 5/2006 | Wang et al. | 370/349 |
| 7,050,424 B2 | 5/2006 | Cheng et al. | |
| 7,058,046 B2 | 6/2006 | Celi | |
| 7,076,562 B2 | 7/2006 | Singhai et al. | |
| 7,082,102 B1 | 7/2006 | Wright | |
| 7,089,307 B2 | 8/2006 | Zintel et al. | |
| 7,140,012 B2 | 11/2006 | Pugh et al. | |
| 7,142,876 B2 | 11/2006 | Trossen et al. | |
| 7,149,222 B2 | 12/2006 | Wiryaman et al. | |
| 7,237,239 B1 | 6/2007 | Goel et al. | |
| 7,243,351 B2 | 7/2007 | Kundu | |
| 7,283,539 B2 * | 10/2007 | Wang et al. | 370/401 |
| 7,292,580 B2 | 11/2007 | Ramamurthy et al. | |
| 7,301,905 B1 | 11/2007 | Tontiruttananon et al. | |
| 7,330,899 B2 | 2/2008 | Wong | |
| 7,380,022 B2 | 5/2008 | Tell et al. | |
| 7,380,073 B2 | 5/2008 | Shorb | |
| 7,392,421 B1 | 6/2008 | Bloomstein et al. | |
| 7,464,178 B2 | 12/2008 | Corrigan et al. | |
| 7,483,438 B2 | 1/2009 | Serghi et al. | |
| 7,499,458 B2 | 3/2009 | McDysan et al. | |
| 7,506,194 B2 | 3/2009 | Appanna et al. | |
| 7,516,450 B2 | 4/2009 | Ogura | |
| 7,522,523 B2 | 4/2009 | Smallwood et al. | |
| 7,623,452 B2 | 11/2009 | Roeder | |
| 7,747,995 B2 | 6/2010 | Fritsch et al. | |
| 7,913,244 B2 | 3/2011 | Zotter et al. | |
| 2002/0039352 A1 | 4/2002 | El-Fekih | |
| 2002/0048269 A1 | 4/2002 | Hong et al. | |
| 2002/0065034 A1 | 5/2002 | Zhang | |
| 2002/0073404 A1 | 6/2002 | Sokolov et al. | |
| 2002/0075844 A1 | 6/2002 | Hagen | |
| 2002/0077134 A1 | 6/2002 | Mizell et al. | |
| 2002/0129174 A1 | 9/2002 | LaBaw | |
| 2002/0144119 A1 | 10/2002 | Benantar | |
| 2002/0147749 A1 | 10/2002 | Ortiz et al. | |
| 2002/0159387 A1 | 10/2002 | Allison | |
| 2003/0028529 A1 | 2/2003 | Cheung et al. | |
| 2003/0033524 A1 | 2/2003 | Tran et al. | |
| 2003/0055920 A1 | 3/2003 | Kakadia et al. | |
| 2003/0093695 A1 | 5/2003 | Dutta | |
| 2003/0095540 A1 * | 5/2003 | Mulligan et al. | 370/352 |
| 2003/0120593 A1 | 6/2003 | Bansal et al. | |
| 2003/0131116 A1 | 7/2003 | Jain et al. | |
| 2003/0139174 A1 | 7/2003 | Rao | |
| 2003/0158908 A1 | 8/2003 | Jacobs et al. | |
| 2003/0165135 A1 | 9/2003 | Itzkovitz et al. | |
| 2003/0227894 A1 | 12/2003 | Wang et al. | |
| 2004/0002881 A1 | 1/2004 | Hu et al. | |
| 2004/0116117 A1 | 6/2004 | Ahvonen et al. | |
| 2004/0139204 A1 | 7/2004 | Ergezinger et al. | |
| 2004/0148357 A1 * | 7/2004 | Corrigan et al. | 709/206 |
| 2004/0160911 A1 | 8/2004 | Zilliacus et al. | |
| 2004/0168162 A1 | 8/2004 | Park et al. | |
| 2004/0196858 A1 | 10/2004 | Tsai et al. | |
| 2004/0218619 A1 | 11/2004 | Salo | |
| 2004/0223602 A1 | 11/2004 | Honkasalo et al. | |
| 2004/0224693 A1 | 11/2004 | O'Neil et al. | |
| 2004/0230682 A1 | 11/2004 | Immonen | |
| 2004/0233866 A1 | 11/2004 | Bossoli et al. | |
| 2004/0246822 A1 | 12/2004 | Wong | |
| 2004/0246947 A1 | 12/2004 | Wong | |
| 2004/0260967 A1 | 12/2004 | Guha et al. | |
| 2004/0267882 A1 | 12/2004 | Whynot et al. | |
| 2005/0005022 A1 | 1/2005 | Taylor | |
| 2005/0022047 A1 | 1/2005 | Chandrasekaran | |
| 2005/0044188 A1 | 2/2005 | Nakazawa et al. | |
| 2005/0044233 A1 | 2/2005 | Cai et al. | |
| 2005/0091362 A1 | 4/2005 | Shigeta et al. | |
| 2005/0097367 A1 | 5/2005 | Nakazawa et al. | |
| 2005/0117602 A1 | 6/2005 | Carrigan et al. | |
| 2005/0152336 A1 | 7/2005 | Bratt | |
| 2005/0185661 A1 | 8/2005 | Scott et al. | |
| 2005/0203962 A1 | 9/2005 | Zhou et al. | |
| 2005/0203994 A1 | 9/2005 | Palmer et al. | |
| 2005/0207432 A1 | 9/2005 | Velez-Rivera et al. | |
| 2005/0226225 A1 | 10/2005 | Shigeta | |
| 2005/0237999 A1 | 10/2005 | Shores et al. | |
| 2005/0259806 A1 | 11/2005 | Chang | |
| 2005/0265276 A1 | 12/2005 | Takeda et al. | |
| 2006/0002333 A1 | 1/2006 | Skog et al. | |
| 2006/0010224 A1 | 1/2006 | Sekar et al. | |
| 2006/0069776 A1 | 3/2006 | Shim et al. | |
| 2006/0090097 A1 | 4/2006 | Ngan et al. | |
| 2006/0109818 A1 | 5/2006 | Ramanna et al. | |
| 2006/0128409 A1 | 6/2006 | Gress et al. | |
| 2006/0174271 A1 | 8/2006 | Chen | |
| 2006/0225108 A1 | 10/2006 | Tabassi et al. | |
| 2006/0233182 A1 | 10/2006 | Appanna et al. | |
| 2006/0288086 A1 | 12/2006 | Gopalakrishnan et al. | |
| 2007/0005766 A1 * | 1/2007 | Singhal et al. | 709/225 |
| 2007/0011617 A1 | 1/2007 | Akagawa et al. | |
| 2007/0091874 A1 | 4/2007 | Rockel et al. | |
| 2007/0100981 A1 | 5/2007 | Adamczyk et al. | |
| 2007/0195779 A1 | 8/2007 | Judge et al. | |
| 2007/0208862 A1 | 9/2007 | Fox et al. | |
| 2007/0288915 A1 | 12/2007 | Zotter et al. | |
| 2008/0021929 A1 | 1/2008 | Fujiwara | |
| 2008/0021939 A1 | 1/2008 | Dahlstedt et al. | |
| 2008/0046963 A1 | 2/2008 | Grayson et al. | |
| 2008/0126832 A1 | 5/2008 | Morosan et al. | |
| 2008/0134165 A1 | 6/2008 | Anderson et al. | |
| 2008/0141239 A1 | 6/2008 | Larsson et al. | |
| 2008/0178169 A1 | 7/2008 | Grossner et al. | |
| 2008/0256257 A1 | 10/2008 | Miller et al. | |
| 2009/0187901 A1 | 7/2009 | Kanai | |
| 2010/0175059 A1 | 7/2010 | Wetherly et al. | |

OTHER PUBLICATIONS

International Search Report and Written Opinion for PCT/US06/11429 dated mailed Aug. 7, 2007, 6 pages.

International Search Report and Written Opinion for PCT/US06/11165 dated Oct. 22, 2007 (7 pages).

Zhuang, et al., "Policy-Based QoS Architecture in the IP Multimedia Subsystem of UMTS", IEEE Network, May/Jun. 2003, pp. 51-57.

Kristensen, A., "SIP Servlet API Version 1.0," Internet article [online], Feb. 4, 2003, http://jcp.org/en/jsr/detail?id=116> [retrieved on Mar. 6, 2009], p. 1—section 1, p. 4—section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

BEA Systems, Inc., BEA WebLogic SIP Server: Configuring and Managing WebLogic SIP Server, Dec. 2, 2005, BEA Systems, Inc., Version 2.1.

Anders, K., "SIP Servlet API Version 1.0," JSR Homepage, XP002517994, www.http://jcp.org.en.jsr.detail?id=116> (Feb. 4, 2004).

Phelim et al., "SIP and the Java Platforms," Sun Microsystems homepage, XP002517995, www.http://java.sun.com/products/jain.SIP-and_Java.html> (Jun. 2003).

Supplementary European Search report for European Application No. EP 06739796.

International Search Report and Written Opinion for PCT/US07/69023, dated Aug. 25, 2008, 8 pages.

(56) References Cited

OTHER PUBLICATIONS

International Search Report and Written Opinion for PCT/US07/69023 dated Aug. 25, 2008.

Hill, "A Management Platform for Commercial Web Services," BT Technology Journal, Springer, vol. 22, No. 1, Jan. 1, 2004, pp. 56-62.

Supplementary European Search Report dated Jun. 19, 2012, in EP 06739904.

Coward et al., "Java Servlet Specification v2.4", Sun Microsystmes, Inc., Nov. 24, 2004, pp. 1-330.

Rosenberg et al., "Best Current Practices for Third Party Call Control in the SIP", The Internet Society, Apr. 2004, pp. 1-32.

O. Kassinen et al., "Group-Based Content Push with Dynamic Session Startup", Proc. of the 4th International conference on Mobile and Ubiquitous multimedia (MUM2005), The University of Canterbury, Christchurch, New Zealand, Dec. 2005, pp. 135-141.

H. Kawashima, et al., "Virtual PC-Type Thin Client System" NEC Technical J., Sep. 2007, pp. 42-47.

M. Garrels, "Is Linux voice over IP ready?" Linux Journal Archive, vol. 145, May 2006, 10 pages.

W. Jiang et al. "Towards Junking the PBX: Deploying IP Telephony," Proceedings of the 11th International Workshop on Network and Operating Systems Support for Digital Audio and Video, p. 177-185, Jan. 2001, Port Jefferson, New York, United States.

Tan et al., "Session Initiation Protocol," In the Proceedings of IEEE ICT'02 Bangkok Thailand, pp. 1310-1314, 2002.

H. Zou, "Prototyping SIP-Based VoIP Services in Java," International Conference on Communication Technology Proceedings, 2000. WCC—ICCT 2000

Magedanz et al., "The IMS Playground @ Fokus—An Open Testbed for Next Generation Network Multimedia Services," TRIDENT COM '05, IEEE (2005), 10 pages.

Olsen et al., "Sip Servlet Discussion," org.apache.tomcat.dev listserv archives; retrieved at http://markmail.org/search/?q=sip+servlet+httpsession+date%03A199811-200605 on Nov. 3, 2010, 5 pages.

Fasel et al., "The FOKUS Open SIP AS—A Service Platform for NGN," In Proceedings Kommunikation in Verteilten Systemen (KiVS), Mar. 2005, pp. 49-56.

\* cited by examiner

SYSTEM AND METHOD FOR CONTROLLING ACCESS TO LEGACY PUSH PROTOCOLS BASED UPON A POLICY

CLAIM OF PRIORITY

The present application claims the benefit of U.S. Provisional Patent Application No. 60/733,823, entitled SYSTEM AND METHOD FOR A GATEKEEPER IN A COMMUNICATIONS NETWORK, by Reto Kramer, et al., filed on Nov. 4, 2005, which is incorporated herein by reference in its entirety.

CROSS REFERENCE TO RELATED APPLICATIONS

The following commonly owned, co-pending United States Patents and Patent Applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer, et al., filed on Mar. 17, 2006;

U.S. Provisional Patent Application No. 60/800,949 entitled, DIAMETER PROTOCOL AND SH INTERFACE SUPPORT FOR SIP SERVER ARCHITECTURE by Anno R. Langen, et al., filed on May 17, 2006;

U.S. Provisional Patent Application No. 60/801,091 entitled SIP AND HTTP CONVERGENCE IN NETWORK COMPUTING ENVIRONMENTS, by Anno R. Langen, et al., filed on May 16, 2006;

U.S. Provisional Patent Application No. 60/800,943 entitled HITLESS APPLICATION UPGRADE FOR SIP SERVER ARCHITECTURE, by, Anno R. Langen et al., filed on May 15, 2006;

U.S. Provisional Patent Application No. 60/801,083 entitled ENGINE NEAR CACHE FOR REDUCING LATENCY IN A TELECOMMUNICATIONS ENVIRONMENT, by Anno R. Langen, et al., filed on May 16, 2006;

U.S. patent application Ser. No. 11/434,022 entitled SYSTEM AND METHOD FOR CONTROLLING DATA FLOW BASED UPON A TEMPORAL POLICY, by Narendra Vemula, et al., filed on May 15, 2006;

U.S. patent application Ser. No. 11/434,024 entitled SYSTEM AND METHOD FOR CONTROLLING ACCESS TO LEGACY PUSH PROTOCOLS BASED UPON A POLICY, by Bengt-Inge Jakobsson, et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas Jansson, filed on May 15, 2006;

U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas Jansson, filed on May 15, 2006;

U.S. patent application Ser. No. 11/432,934 entitled SYSTEM AND METHOD FOR SHAPING TRAFFIC, by Jan Svensson, filed on May 12, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing telecommunications and more particularly to a mechanism for controlling access to legacy push protocols based upon a policy.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings.

DETAILED DESCRIPTION

Figure 1A:
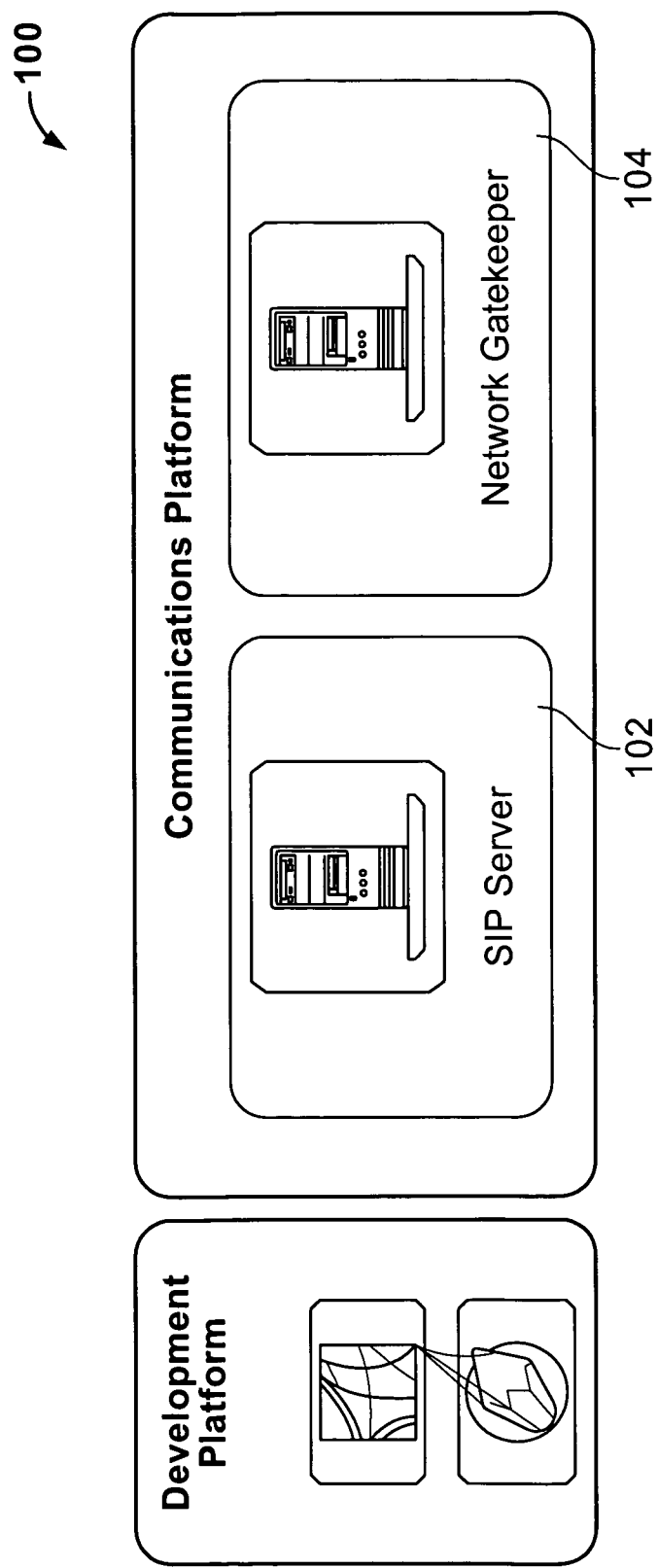
FIGS. 1A-1B are illustrations of an example communications platform that can be used to control access to legacy push protocols based upon a policy in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for controlling access to telecommunications resources implementing a legacy protocol based upon a policy. These mechanisms and methods for controlling access to legacy protocols based upon a policy can enable embodiments to control access by third party created and other applications to network resources implementing legacy telecommunications protocols. The ability of embodiments to control access by third party created and other applications to network resources can enable network providers to provide greater access to network resources without compromising security of other users. Embodiments may further provide the ability to interface with legacy push protocols, multimedia message protocols and short message peer-to-peer protocols.

In an aspect and according to embodiments, there are provided mechanisms and methods for controlling access to telecommunications resources implementing a legacy push protocol based upon a policy. In an embodiment and by way of example, a telecommunications system is provided. A system embodiment includes an application interface to receive at least one invocation to a legacy push protocol from a legacy application. A gatekeeper controls access through the telecommunications system by applying at least one policy to the invocation. The at least one policy indicates whether the legacy application is permitted to use a resource of the telecommunications system. A resource interface connecting the gatekeeper with at least one resource element implementing the legacy push protocol receives the at least one invocation to a legacy push protocol when the gatekeeper permits the legacy application to use a resource of the telecommunications system.

In another aspect and according to embodiments, there are provided mechanisms and methods for controlling access to telecommunications resources implementing a legacy multimedia message protocol based upon a policy. In an embodiment and by way of example, a telecommunications system is provided. A system embodiment includes an application interface to receive at least one invocation to a legacy multimedia message protocol from a legacy application. A gatekeeper controls access through the telecommunications system by applying at least one policy to the invocation. The at least one policy indicates whether the legacy application is permitted to use a resource of the telecommunications system. A resource interface connects the gatekeeper with at least one resource element implementing the legacy multimedia message protocol to receive the at least one invocation to a legacy multimedia message protocol when the gatekeeper permits the legacy application to use a resource of the telecommunications system.

In a yet further aspect and according to embodiments, there are provided mechanisms and methods for controlling access to telecommunications resources implementing a legacy short message peer-to-peer protocol based upon a policy. In an embodiment and by way of example, a telecommunications system is provided. A system embodiment includes an application interface to receive at least one invocation to a legacy short message peer-to-peer protocol from a legacy application. A gatekeeper controls access through the telecommunications system by applying at least one policy to the invocation. The at least one policy indicates whether the legacy application is permitted to use a resource of the telecommunications system. A resource interface connects the gatekeeper with at least one resource element implementing the legacy short message peer-to-peer protocol to receive the at least one invocation to a legacy short message peer-to-peer protocol when the gatekeeper permits the legacy application to use a resource of the telecommunications system.

As used herein, the terms service and web service are used interchangeably and are intended to be broadly construed to include any application, program or process resident on one or more computing devices capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems.

As used herein, the term legacy push protocol is defined as a legacy protocol used by applications to push data to a client device, such as without limitation Push Application Protocol (PAP) for example. The Push Access Protocol (PAP), defined by the Wireless Application Protocol (WAP) Forum, outlines a proactive way to send information from Internet servers to WAP enabled mobile devices without the user having to actively request it. Typical use cases include alerts to which the user has subscribed, small ads, and email notifications. Combined with other applications, such as location-based services, push becomes a flexible way of providing users with real-time information. For example and without limitation, a tourist service could use push messaging to automatically inform a user of interesting sites nearby and suggest the closest restaurant according to predefined preferences and even provides a link to order a table.

As used herein, the term legacy multimedia message protocol is defined as a legacy protocol used by an application to exchange multimedia data to a client device, such as without limitation Multimedia Message Protocol 7 (MM7) for example. Multimedia Messaging Service (MMS) enables the addition of images, text, audio clips and ultimately, video clips to SMS (Short Message Service/text messaging). MMS implementations may offer a development and billing environments. The MM7 protocol provides a mechanism for sending value-added service content from those third parties to subscribers who have MMS-enabled mobile devices. The MM7 protocol defines and manages the data interface and protocols for the communication between Value-Added Service Providers (VASPs), which generate the multimedia message content, and carriers, which deliver the content to a recipient device or forward it to a remote carrier for delivery As used herein, the term legacy short message peer-to-peer protocol is defined as a legacy protocol used by applications to exchange data in short messages with one another, such as without limitation Short Message Peer-To-Peer Protocol (SMPP) for example. The SMPP version 3.4, for example and without limitation, is a Short Message Peer to Peer Protocol that is an open, industry standard protocol designed to provide a flexible data communications interface for transfer of short message data between a Message Center such as a Short Message Service Center (SMSC), Global System for Mobile communications (GSM) Unstructured Services Data (USSD) Server or other type of message center and a message center and a SMS application system. This includes WAP Proxy Server, email gateway, or other messaging gateway As used herein, the term legacy application is defined as an application designed to interface with a legacy protocol. As used herein, the term resource interface is defined as a mechanism to provide access for services to reach callers and end user applications (clients) via a network. As used herein, the term resource element is defined as a network resource that implements a protocol within a network, such as without limitation Short Message Service (SMS), Multimedia Message Service (MMS) for example and others.

FIG. 1A is an illustration of an example communications platform that can be used to control access to legacy push protocols based upon a policy in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A SIP server 102 and a network gatekeeper 104 comprise a portfolio of product collectively comprise a communications platform 100. The SIP server 102 provides the communications platform 100 with a subsystem in which application components that interact with SIP-based networks may be deployed. The network gatekeeper 104 provides a policy-driven telecommunications Web services gateway that allows granular control over access to network resources from untrusted domains.

Figure 1B:
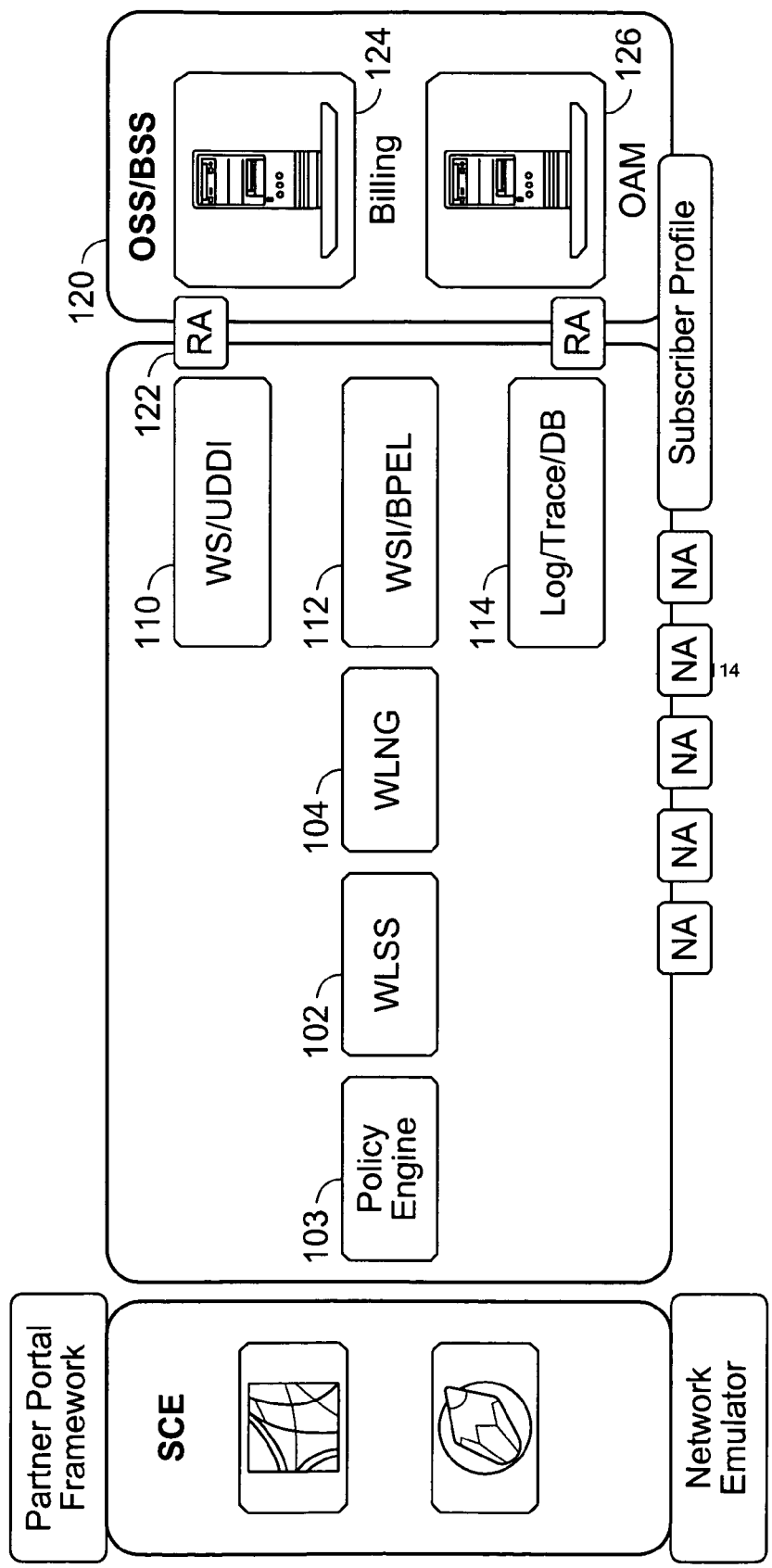

A variety of shared and re-usable software and service infrastructure components comprise the communications platform 100. For example, an application server, such as the WebLogic™ Application Server by BEA Systems, Inc. of San Jose, Calif. This application server may be augmented and adapted for deployment in telecommunications networks, while providing many features and functionality of the WebLogic™ Server counterpart widely deployed in enterprise computing environments. Application server embodiments for use in the telecommunications applications can provide a variety of additional features and functionality, such as without limitation:

Optimized for Peak Throughput
Clustering for Scalability and High-Performance
Generalized for wide range of target platforms (HW/OS) support
Extensive deployment configuration options
Optimized for local management
Plug and play Enterprise Information Systems (EIS) support Analogously, communications platform embodiments can provide a variety of additional features and functionality, such as without limitation:

Highly Deterministic Runtime Environment
Clustering for High-Availability (HA) and Scalability
Optimized for Telecom HW/OS/HAM W platforms support (SAF, ATCA, HA M/W, etc.)
Hardened configuration
Optimized for Telecom NMS integration
Telecommunications network connectors and interfaces FIG. 1B is another illustration of an example communications platform that can be used to control access to legacy push protocols based upon a policy in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a Session Initiation Protocol (SIP) Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the communications platform 100 can interface with processes that monitor underlying network function, such as Operations Support Systems/Business Support Systems (OSS/BSS) system 120 via RA protocol adapters 122. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections 124, customer management, including order entry, customer self services, customer care, trouble ticketing, and customer relationship management. Such interfaces can provide access to Operation, Administration, and Maintenance (OAM) applications 126 and others. A policy engine 103 controls access by one or more third party services (not shown) and services (not shown) to resource elements (not shown) in a network layer.

A Service Creation Environment (SCE) enables service providers to create applications using a higher level programming abstraction tool to expedite application creation. Other types of tools may be provided in embodiments to enable internal staff who are not necessarily software engineers (e.g. business analysts, IT/MIS staff) but are programmers or have programming skills (e.g. internal software engineers with knowledge of the carrier's network etc. but perhaps less savvy as high power J2EE software engineers) to be able to create or modify applications.

A communications platform embodiment can provide an open, high performance, software based fault-tolerant platform that allows operators to maximize revenue potential by shortening time to market and significantly reducing per-service implementation and integration cost and complexity. The communications platform is suitable for use by for network infrastructure vendors, network operators and communications service providers in multiple deployment scenarios ranging from fully IP multi-media subsystem (IMS) oriented network architectures to hybrid and highly heterogeneous network architectures. It is not restricted to use only in carrier networks, however, and may be deployed in Enterprise communications networks without restriction or extensive customization. When deployed in conjunction with an IP multi-media subsystem, the communications platform can serve in the role of an IMS SIP application server and offers communications service providers an execution environment in which to host applications (such as the WebLogic™ Network Gatekeeper), components and standard service enablers. The following diagrams illustrate example network gatekeeper embodiments in telecommunications systems.

Figure 2A:
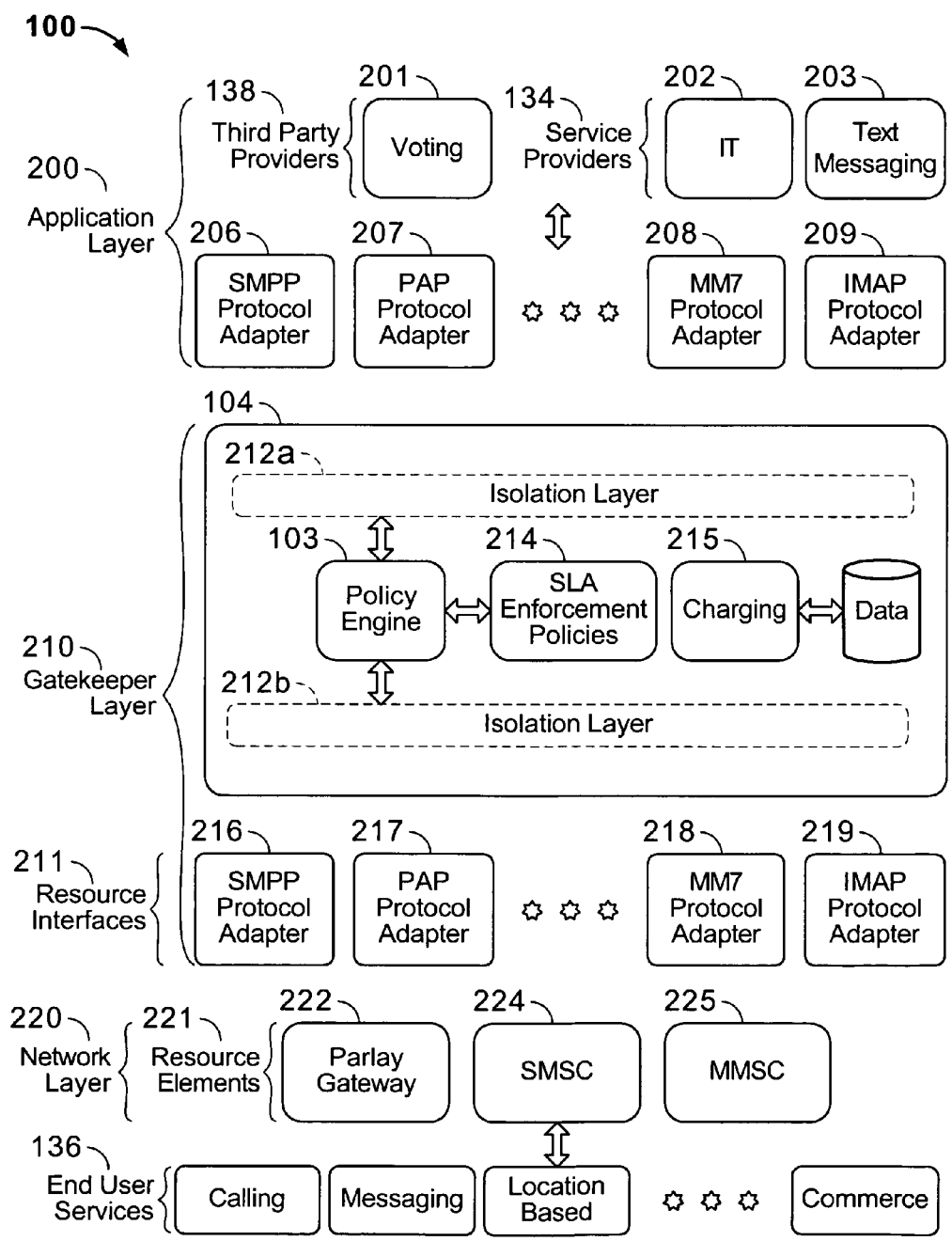
FIGS. 2A-2B are illustrations of example functional aspects of a communications platform embodiment.

FIG. 2A in an illustration of example functional aspects of a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated by FIG. 2A and by way of example, an embodiment of a communications platform 100 provides an easy to use, integrated, configuration-driven intermediary between service providers 134, third party service providers 138 and end users 136. The communications platform 100 embodiment illustrated by FIG. 2A comprises an application layer 200 with interfaces to applications of the service providers 134 and third party service providers 138 and a network layer 220 to interface with the end users 136 via one or more network resource elements 221. Communications platform 100 further comprises a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages customer A sends an hour, and if over a contract limit, customer A starts paying more, and so forth. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 2A, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem) 223, an SMSCs (short-message-service-center) 224 and MMSCs (multi-media messaging service center) 225, each of which provides a mechanism for moving information through the network to one or more end user services 136.

Figure 2B:
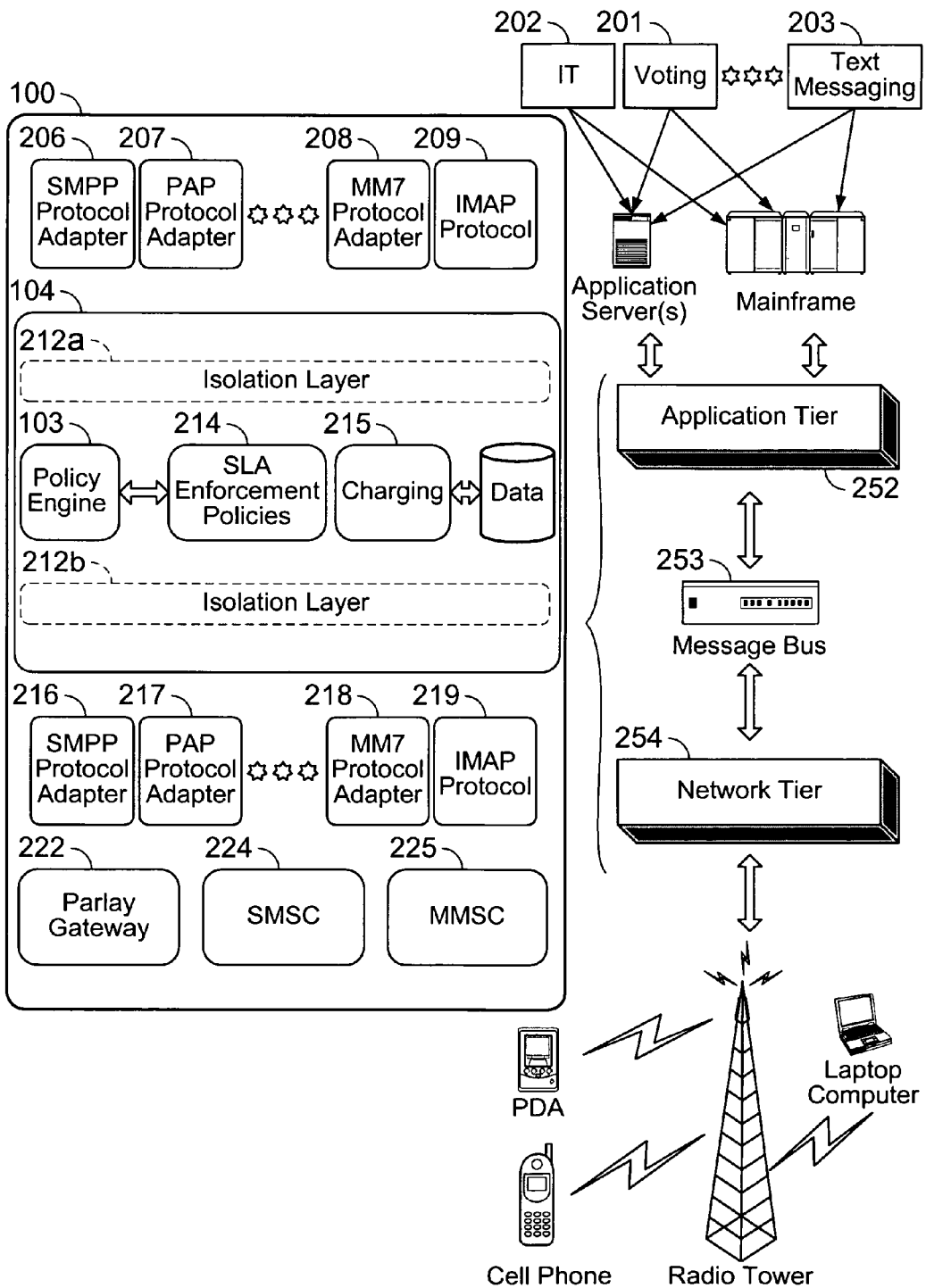

FIG. 2B is functional block diagram that shows a high level overview of an example logical architecture in which techniques for managing services in a communications network may be embodied. By way of example and as illustrated by FIG. 2B, communications platform 100 of FIG. 2A may be implemented using multi-tier system architecture. As shown in FIG. 2B, an example multi-tier system architecture provides independent, coordinated execution of business logic implementing services and the like, executing in one tier, and communications connection management logic which executes in a second tier. An application tier 252 comprises machines capable of executing applications, including applications provided by third parties, on behalf of callers that initiate communications sessions managed by the network tier 254. In an embodiment, an interconnection mechanism 253 provides an interconnection between network elements of application tier 252 and network tier 254. In an example embodiment, interconnection mechanism 253 comprises Java Messaging Service (JMS). In an alternate embodiment, interconnection mechanism 253 is implemented using Common Object Request Broker Architecture (CORBA), a group of application programming interfaces (APIs), communication protocols, and object/service information models to enable heterogeneous applications written in various languages running on various platforms to interoperate.

Figure 3A:
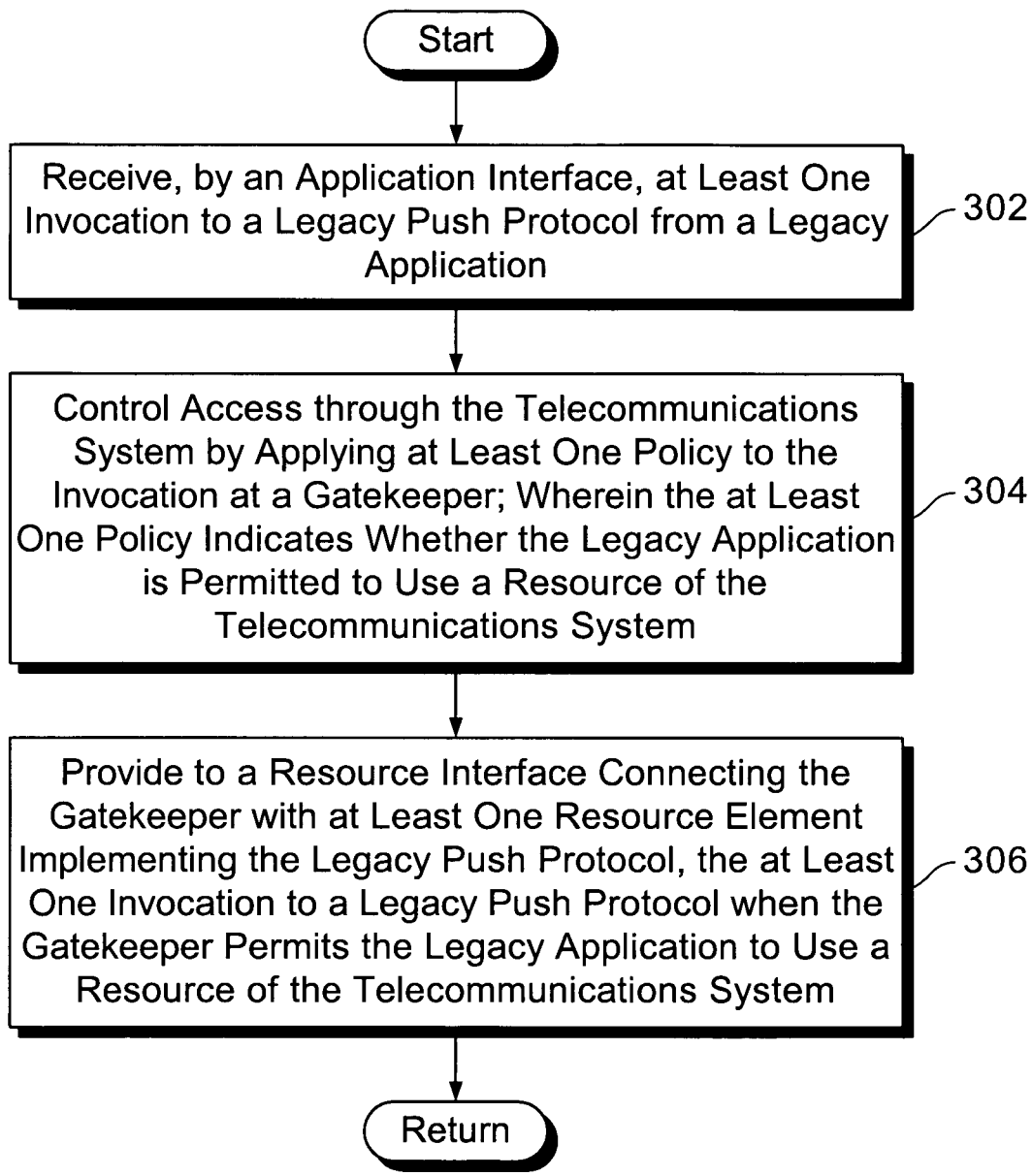
FIGS. 3A-3C are operational flow diagrams illustrating a high level overview of techniques for controlling access to legacy protocols based upon a policy in an embodiment.

FIG. 3A is an operational flow diagram illustrating a high level overview of a technique for controlling access to legacy push protocols based upon a policy in an embodiment. The technique for controlling access to legacy push protocols based upon a policy shown in FIG. 3A is operable with a network gatekeeper, such as network gatekeeper 104 of FIG. 1A and FIG. 1B, for example. As shown in FIG. 3A, at least one invocation to a legacy push protocol is received from a legacy application by an application interface (block 302). For example and without limitation, this can include receiving at least one invocation to a legacy push application protocol (PAP) from a legacy application.

A network gatekeeper controls access through the telecommunications system by applying at least one policy to the invocation (block 304). The at least one policy indicates whether the legacy application is permitted to use a resource of the telecommunications system. By way of example and without limitation, this can include controlling access through the telecommunications system with a policy engine at a gatekeeper by applying at least one policy in accordance with a service level agreement (SLA) to the invocation.

A resource interface connecting the gatekeeper with at least one resource element implementing the legacy push message protocol is provided the at least one invocation to a legacy push message protocol when the gatekeeper permits the legacy application to use a resource of the telecommunications system (block 306). In embodiments, this can include receiving, the at least one invocation to a legacy push protocol at a resource interface plug-in connecting the gatekeeper with at least one resource element implementing the legacy push application protocol (PAP) when the gatekeeper permits the legacy application to use a resource of the telecommunications system for example.

Figure 3B:
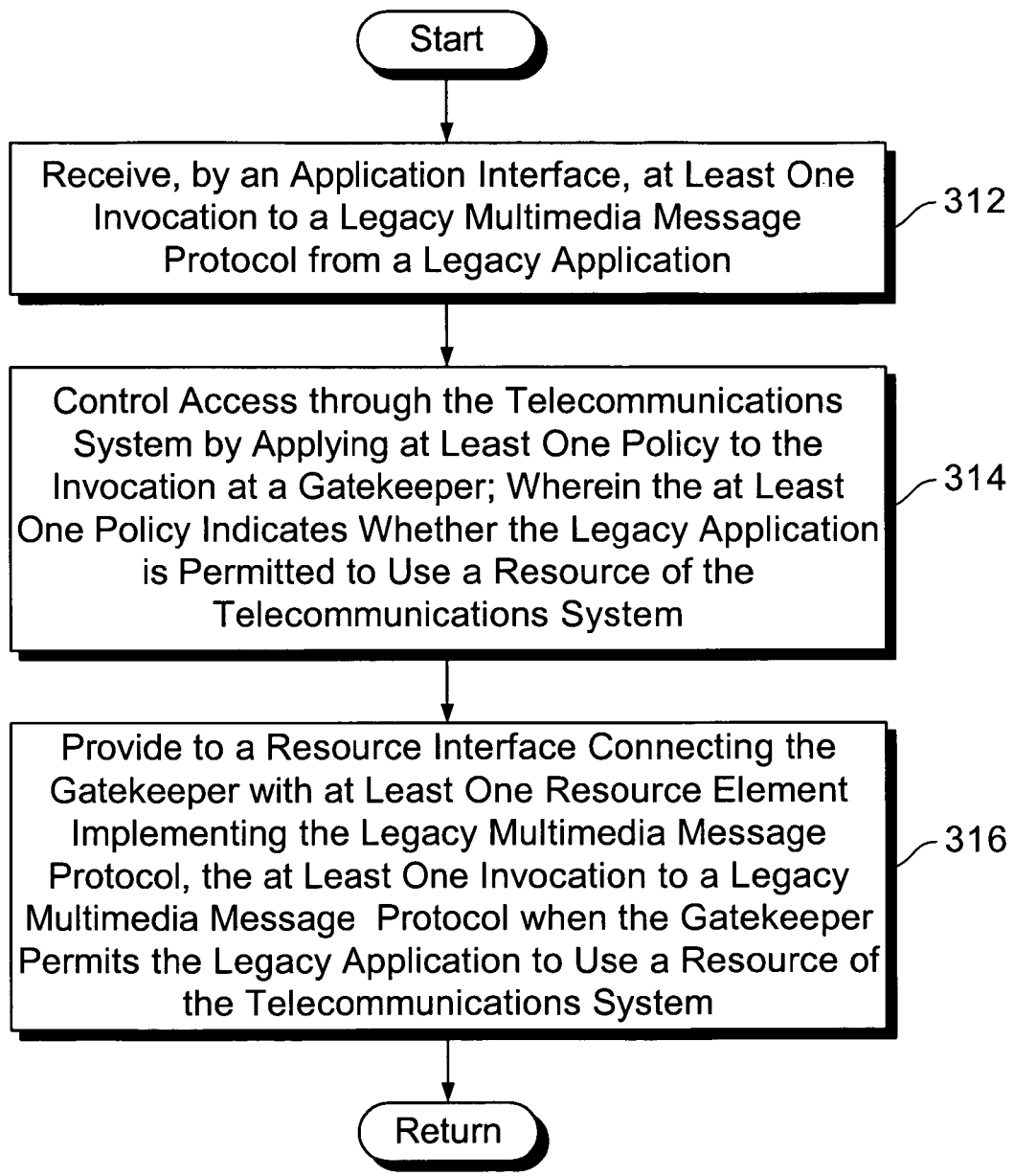

FIG. 3B is an operational flow diagram illustrating a high level overview of a technique for controlling access to legacy multimedia protocols based upon a policy in an embodiment. The technique for controlling access to legacy multimedia protocols based upon a policy shown in FIG. 3B is operable with a network gatekeeper, such as network gatekeeper 104 of FIG. 1A and FIG. 1B, for example. As shown in FIG. 3B, at least one invocation to a legacy multimedia message protocol is received from a legacy application by an application interface (block 312). For example and without limitation, this can include receiving at least one invocation to a legacy multimedia message services protocol (MM7) from a legacy application.

A network gatekeeper controls access through the telecommunications system by applying at least one policy to the invocation. The at least one policy indicates whether the legacy application is permitted to use a resource of the telecommunications system (block 314). By way of example and without limitation, this can include controlling access through the telecommunications system with a policy engine at a gatekeeper by applying at least one policy in accordance with a service level agreement (SLA) to the invocation.

A resource interface connecting the gatekeeper with at least one resource element implementing the legacy multimedia message protocol is provided the at least one invocation to a legacy multimedia message protocol when the gatekeeper permits the legacy application to use a resource of the telecommunications system (block 316). In embodiments, this can include receiving the at least one invocation to a legacy multimedia message protocol at a resource interface plug-in connecting the gatekeeper with at least one resource element implementing the legacy multimedia message services protocol (MM7) when the gatekeeper permits the legacy application to use a resource of the telecommunications system for example.

Figure 3C:
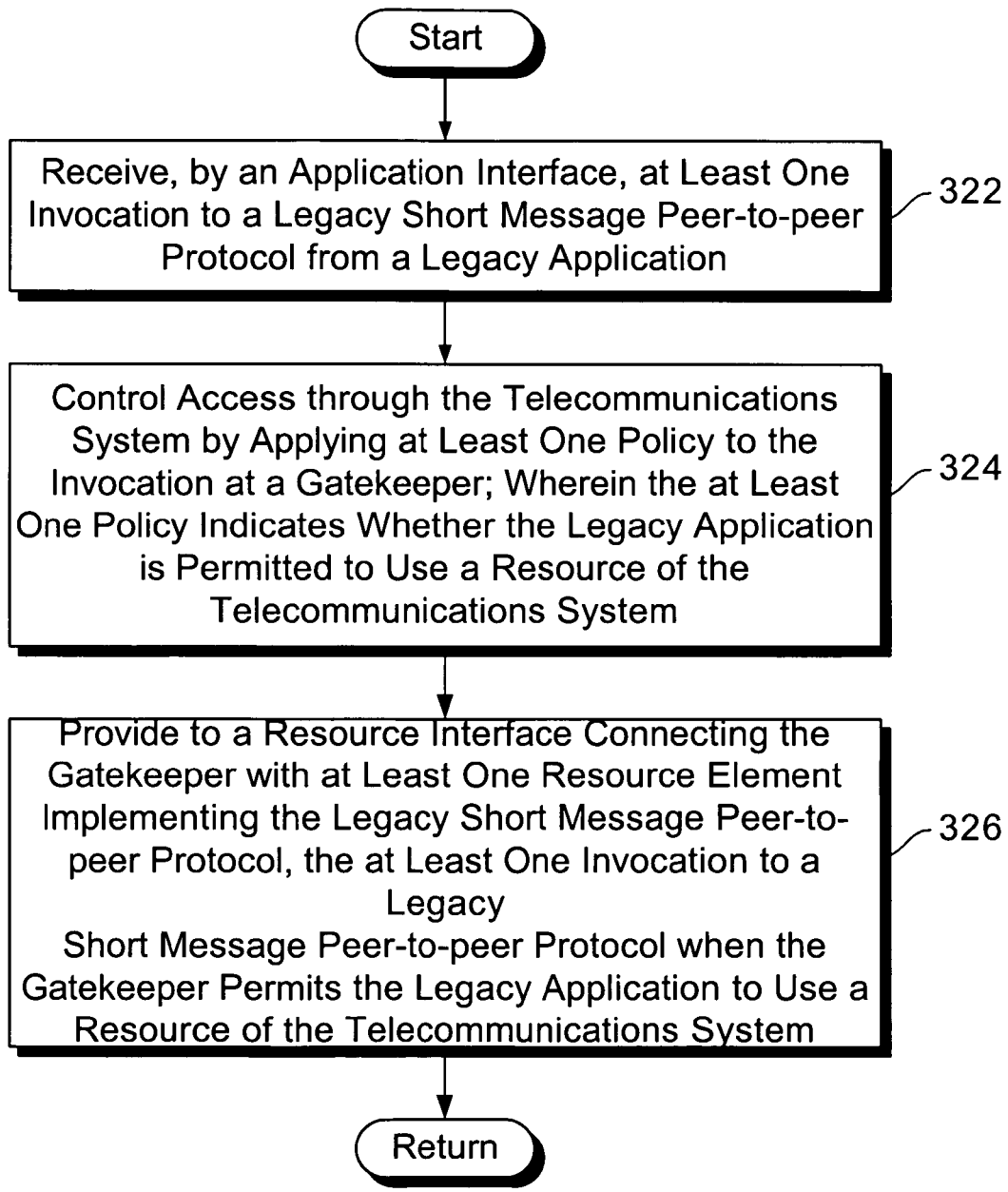

FIG. 3C is an operational flow diagram illustrating a high level overview of a technique for controlling access to legacy short message peer-to-peer protocols based upon a policy in an embodiment. The technique for controlling access to legacy short message peer-to-peer protocols based upon a policy shown in FIG. 3C is operable with a network gatekeeper, such as network gatekeeper 104 of FIG. 1A and FIG. 1B, for example. As shown in FIG. 3C, at least one invocation to a legacy short message peer-to-peer protocol is received from a legacy application by an application interface (block 322). For example and without limitation, this can include receiving at least one invocation to a legacy Short Message Peer-to-Peer Protocol (SMPP) from a legacy application.

A network gatekeeper controls access through the telecommunications system by applying at least one policy to the invocation. The at least one policy indicates whether the legacy application is permitted to use a resource of the telecommunications system (block 324). By way of example and without limitation, this can include controlling access through the telecommunications system with a policy engine at a gatekeeper by applying at least one policy in accordance with a service level agreement (SLA) to the invocation.

A resource interface connecting the gatekeeper with at least one resource element implementing the legacy short message peer-to-peer protocol is provided the at least one invocation to a legacy short message peer-to-peer protocol when the gatekeeper permits the legacy application to use a resource of the telecommunications system (block 326). In embodiments, this can include receiving the at least one invocation to a legacy short message peer-to-peer protocol at a resource interface plug-in connecting the gatekeeper with at least one resource element implementing the legacy Short Message Peer-to-Peer Protocol (SMPP) when the gatekeeper permits the legacy application to use a resource of the telecommunications system.

Push Application Protocol (PAP)

Figure 4A:
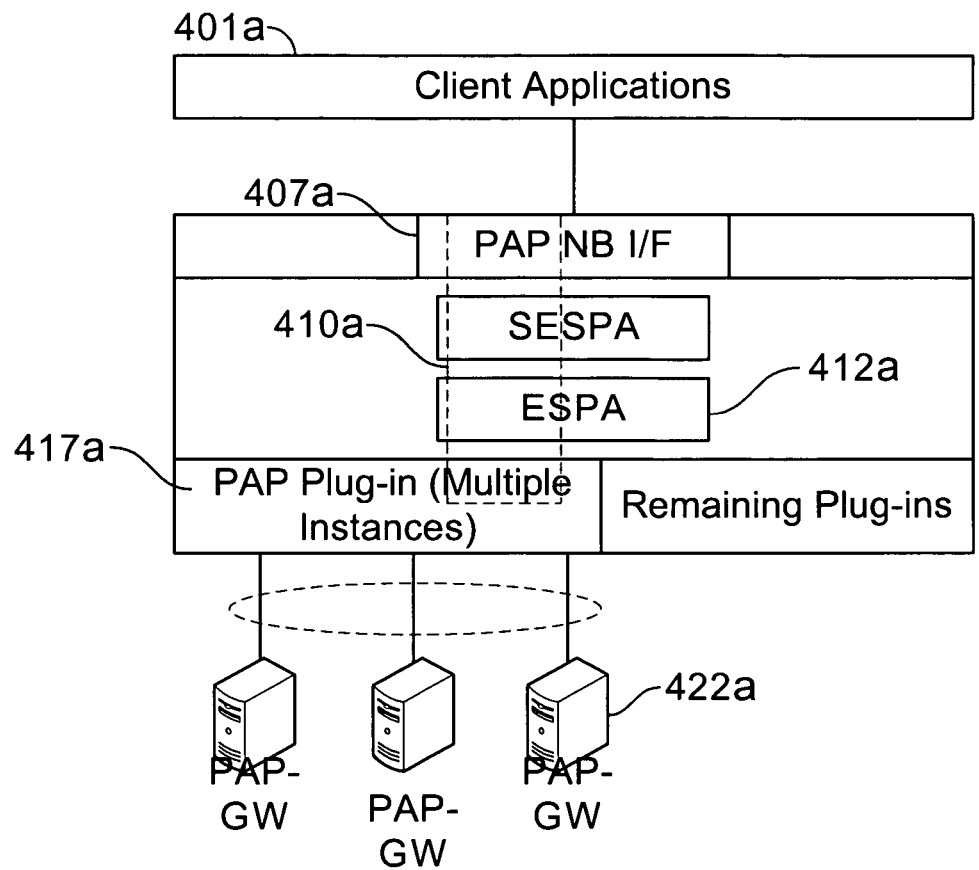
FIGS. 4A-4C are illustrations of example functional aspects of a legacy protocol coupled with a communications platform embodiment.

FIG. 4A is an illustration of example functional aspects of a legacy push protocol coupled with a communications platform embodiment. A Push Initiator residing on an Internet server to access a push proxy gateway uses the Push Access protocol. The Push Access Protocol is designed to be independent of the underlying transport protocol. A messaging pipe 410a routes a push application protocol message from a push initiator 401a to network elements 422a. In this example, the PAP interface 407a communicates with an ESPA module 412a. The ESPA module 412b then communicates with a plug in manager (not shown) for the PAP Plug-in resource interface 417a. The PAP Plug-in resource interface 417a provides connectivity to the network elements 422a. Network elements 422a may provide connectivity to a push proxy gateway that pushes the messages to clients.

Figure 5A:
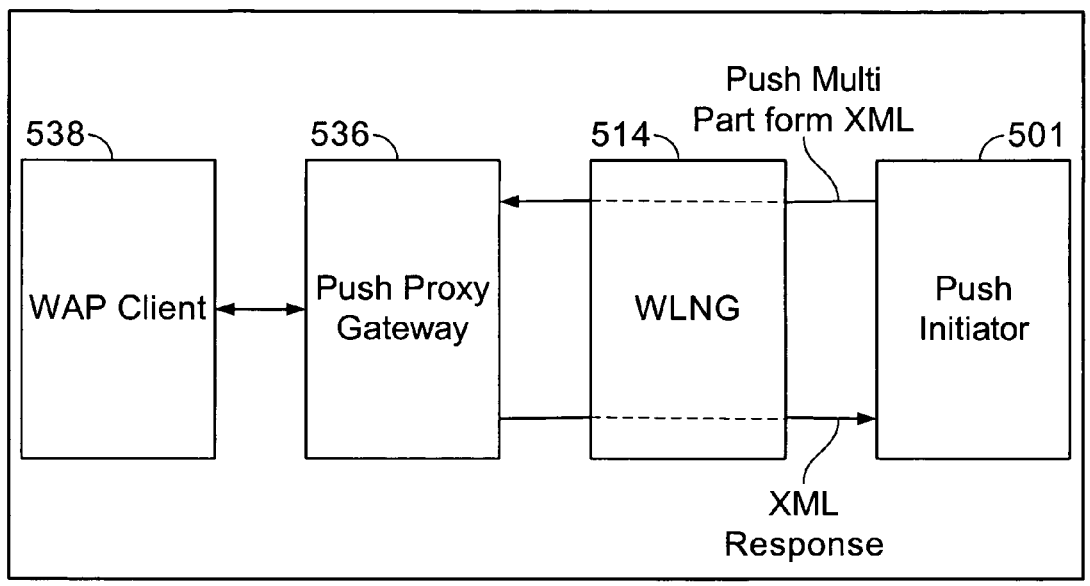
FIGS. 5A-5C are illustrations of example usage scenarios of legacy protocols in embodiments.

FIG. 5A illustrates an example usage scenario of the PAP Protocol in an embodiment. The Push Initiator 501 interfaces directly with the gatekeeper 514 to initiate an application layer connection for sending push messages. The gatekeeper 514 controls message traffic between the push initiator 501 and push proxy gateway 536. Push proxy gateway 536 pushes the messages to the consumer clients 538.

The response and result notification is used by the push proxy gateway 536 to inform the push initiator 501 of the final outcome of a push submission, if requested by the push initiator 501. This notification tells the push initiator 501 that the message was sent, delivered (confirmation received from wireless device), expired, cancelled, or there was an error. If there was a processing error, the notification can be sent immediately upon detection of the error to the push initiator 501 and the message should not be sent to the client. Otherwise, the notification will be sent after the message delivery process has been completed. The delivery process is considered completed when the message is no longer a candidate for delivery, e.g. the message has expired. If the push submission is indicated as rejected, then no result notification will be sent.

Gatekeeper embodiments can provide Quality of Service, SLAs-Policy enforcement, traffic throttling, Service Provider/Application authentication and others. Embodiments can ensure that carrier network elements are used in the most optimal and controlled manner when Push messages are submitted to a push proxy gateway.

Multimedia Messaging Protocol (MM7)

Figure 4B:
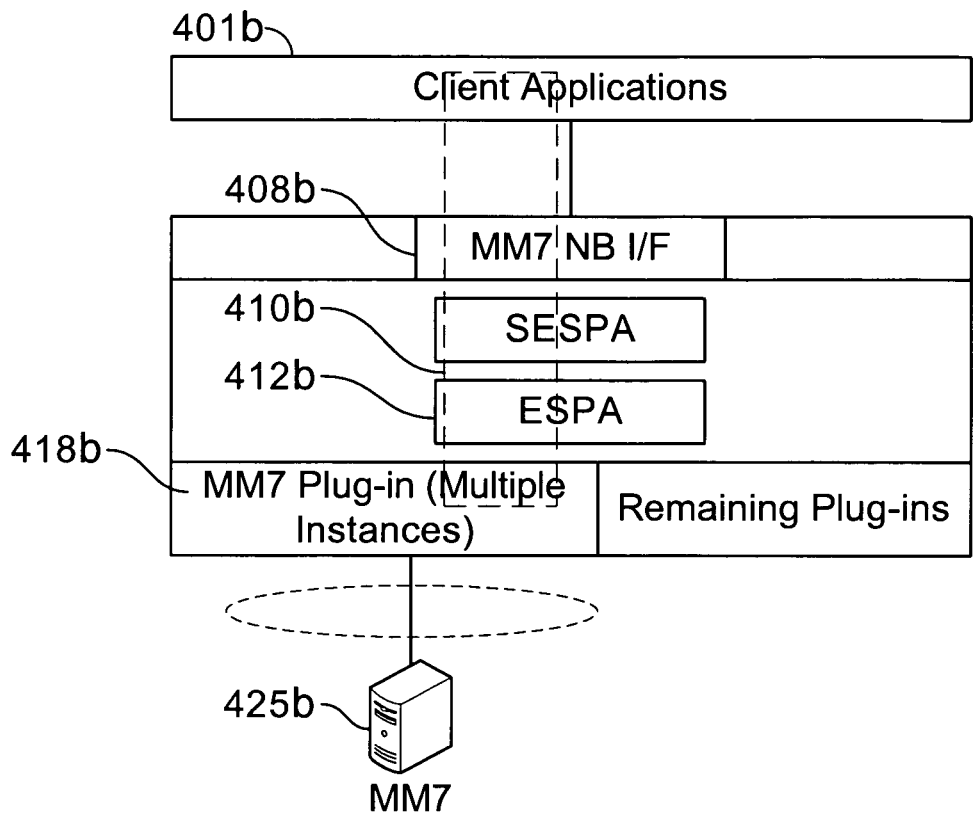

FIG. 4B is an illustration of example functional aspects of a legacy multimedia messaging protocol coupled with a communications platform embodiment. A messaging pipe 412b routes the message from a client application 401b to the network elements 425b. In this example, the MM7 interface 408a communicates with a SESPA module. The SESPA module in turn routes message/comments via the ESPA layer 412b. The ESPA layer 412b in turn communicates with the plug in manager (not shown) of the MM7 Plug-in resource interface 418b. The MM7 Plug-in resource interface 418a provides connectivity to the network elements 425b. Network elements 425b may provide connectivity to end user clients.

Figure 5B:
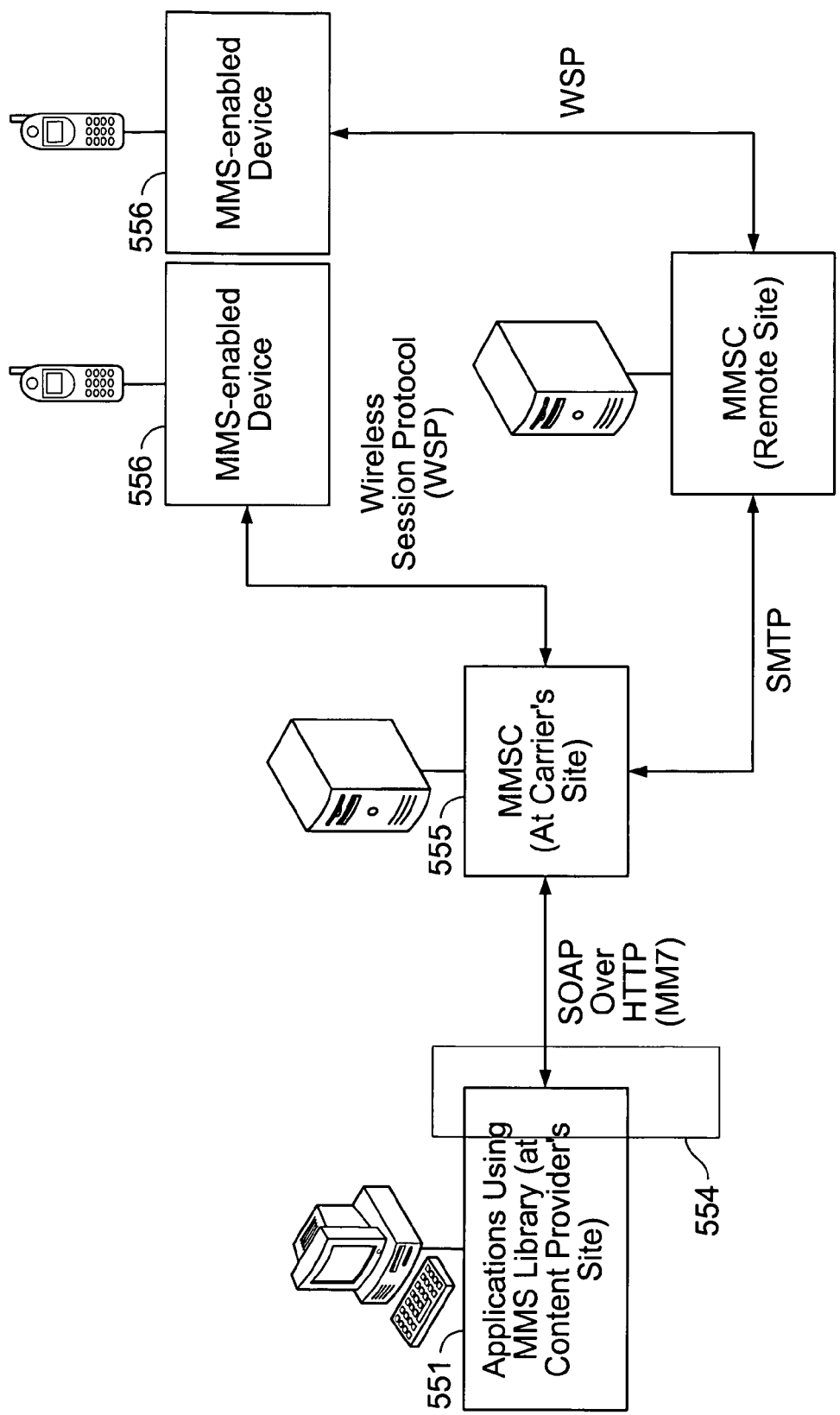

FIG. 5B illustrates an example usage scenario of the MM7 Protocol in an embodiment. In the usage scenario illustrated by FIG. 5B, the network gatekeeper 554 is shown integrated as part of a MM7 architecture. The applications 551 will interface directly with the network gatekeeper 554 to initiate an application layer connection for sending multimedia messages. The gatekeeper 554 controls message traffic between the application 551 and MMSC 555. The MMSC 555 provides connectivity to the consumer clients 556.

The gatekeeper embodiments can provide Quality of Service, SLAs-Policy enforcement, traffic throttling, Service Provider/Application authentication and others. Embodiments can ensure that carrier network elements are used in the most optimal and controlled manner when multimedia messages are sent to the MMSC.

Short Message Peer-To-Peer Protocol (SMPP)

Figure 4C:
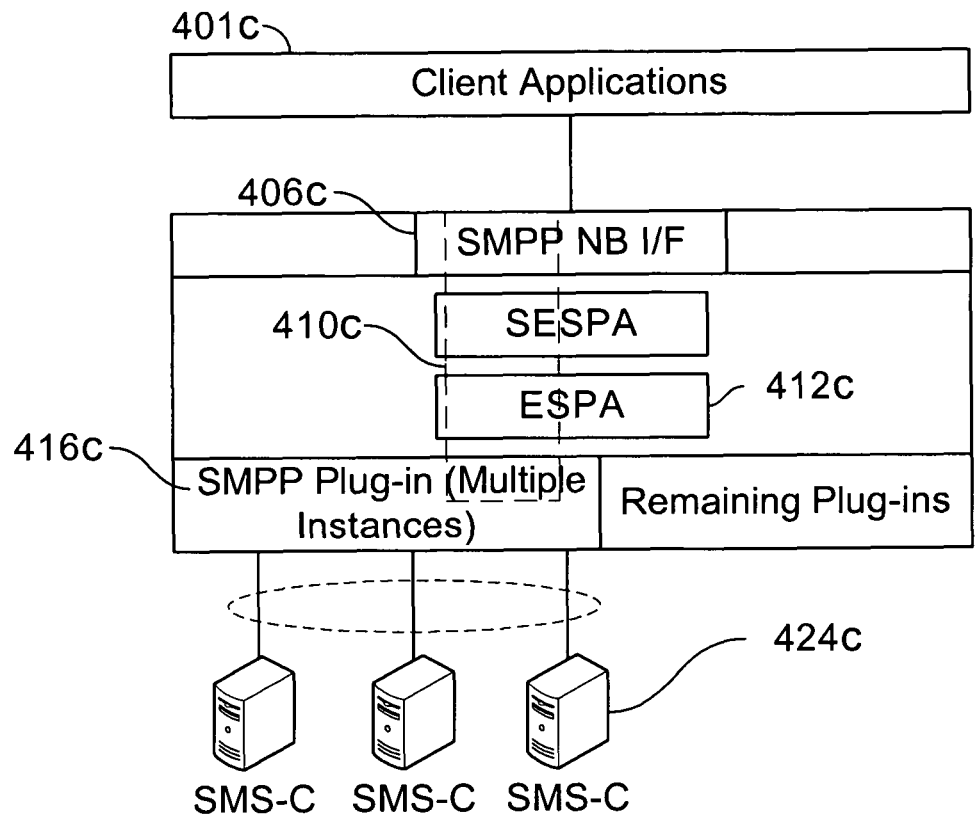

FIG. 4C is an illustration of example functional aspects of a legacy short message peer-to-peer protocol coupled with a communications platform embodiment. FIG. 4C illustrates a messaging pipe 410c that routes a short peer-to-peer message from the application 401c to network elements 422c. In this example, the SMPP interface 406c communicates with an ESPA module 412c. The ESPA module 412c then communicates with a plug in manager (not shown) for the SMPP Plug-in resource interface 416c. The SMPP Plug-in resource interface 416c provides connectivity to the network elements 424c.

If a short message is too long to fit inside one SUBMIT_SM operation at the client on which the application 401c resides, the SMPP Client will split the message and send it using multiple SUBMIT_SM operations. The SMPP interface 406c will collect the multiple SUBMIT_SM operations and turn them into one sendSMS call towards ESPA module 412c. Later when a processNotification call is made by ESPA module 412c to indicate that the message was delivered, the SMPP interface 406c will send multiple DELIVER_SM operations to the SMPP Client, i.e. multiple delivery receipts. This is when there were multiple messages that were sent.

Figure 5C:
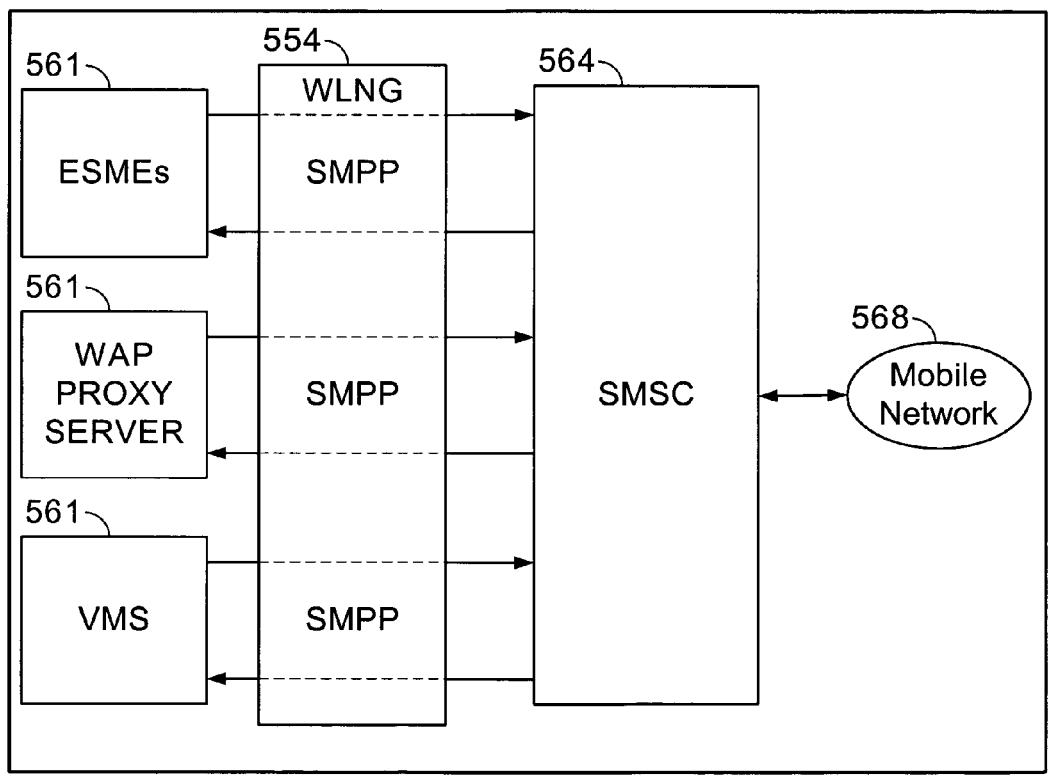

FIG. 5C illustrates an example usage scenario of the SMPP Protocol in an embodiment. An SMS application system called the "External Short Message Entity" (ESME) 561 may initiate an application layer connection via the gatekeeper 566 with an SMSC 568 over a TCP/IP" or "X.25" network connection and may then send short messages and receive short messages to and from the SMSC 568 respectively. The EMSE may query, cancel, or replace short messages using SMPP.

Applications such as WAP Proxy Client, VMS and Paging Bureau will interface directly with the gatekeeper. The gatekeeper embodiments can provide Quality of Service, SLAs-Policy enforcement, traffic throttling, Service Provider/Application authentication and others. Embodiments can ensure that carrier network elements are used in the most optimal and controlled manner when SMS messages are exchanged with the SMSC.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for controlling access to legacy push protocols based upon a policy as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. The list of advanced features is operators specific. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A telecommunications system, comprising:
an application, provided as part of an application tier, that initiates a push message to a mobile device, wherein the application tier includes one or more additional applications, and a plurality of protocol adapters, wherein each of said protocol adapters accepts, from one of the plurality of applications, messages implementing a different protocol and converts each of said messages to SIP protocol;
a resource interface, including a plug-in manager and a plurality of instances of a push message plug-in, wherein the plug-in manager selects at least one of the plurality of instances of the push message plug-in to connect with a telecommunications network resource implementing a push message protocol that will transmit the push message to said mobile device;
a messaging pipe that receives the push message from a said push messaging protocol adapter and routes the push message to the telecommunications network resource;
a gatekeeper between the application tier and the telecommunications network resource, wherein the gatekeeper implements the SIP protocol and includes a policy engine that creates, customizes and executes one or more policies based on one or more service level agreements, wherein said policies indicate whether the application is permitted to use the telecommunications network resource;
wherein the gatekeeper intercepts the push message from the messaging pipe, and provides the push message to the policy engine which applies at least one said policy to the push message; and
wherein in response to the policy engine applying said at least one policy to the push message, the gatekeeper provides the push message to the resource interface connecting the gatekeeper with the telecommunications network resource.

2. The telecommunications system of claim 1, further comprising:
a push proxy gateway to send the push message from the telecommunications network resource to Wireless Application Protocol enabled mobile devices without a user having to actively request it.

3. The telecommunications system of claim 2, wherein the push message is at least one of an alert to which the user has subscribed, a small ad, and an email notification.

4. The telecommunications system of claim 2, further comprising:
a location-based service combined with the push proxy gateway to provide the user with real-time information.

5. The telecommunications system of claim 1, wherein the plurality of protocol adapters include a Short Message Peer-to-Peer protocol (SMPP) protocol adapter, a Push Application Protocol (PAP) protocol adapter, a Multimedia Messaging Services (MM7) protocol adapter and an Internet Message Access Protocol (IMAP) protocol adapter.

6. The telecommunications system of claim 1, wherein routing the push message from the application to the telecommunications network resource includes
requesting by the application a notification from the gatekeeper, wherein the notification indicates whether the push message was sent, delivered, expired or canceled.

7. A method for controlling access to a push protocol based upon a policy in a telecommunications system, the method comprising:
providing a gatekeeper that implements SIP protocol and includes a policy engine, wherein the policy engine creates, customizes and executes one or more policies based on one or more service level agreements, wherein said policies indicate whether an application is permitted to use a telecommunications network resource;
receiving, by a push messaging protocol adapter, a push message from the application provided as part of an application tier, wherein the application tier includes a plurality of additional applications and a plurality of additional protocol adapters, wherein each of said protocol adapters accepts, from one of the plurality of applications, messages implementing a different protocol and converts each of said messages to the SIP protocol;
providing a messaging pipe that receives the push message from the push messaging protocol adapter and routes the push message to the telecommunications network resource implementing a push message protocol that will transmit the push message to a mobile device;
intercepting, via the gatekeeper, the push message and applying with the policy engine at least one said policy to the push message; and in response to applying with the policy engine said at least one policy to the push message, providing the push message to the resource interface that contains a plug-in manager and a plurality of instances of a push message plug-in, wherein the plug-in manager selects at least one of the plurality of instances of the push message plug-in to connect with the telecommunications network resource.

8. The method of claim 7, further comprising:
providing a push proxy gateway to send the push message from the telecommunications network resource to Wireless Application Protocol enabled mobile devices without a user having to actively request it.

9. The method of claim 8, wherein the push messages is at least one of an alert to which the user has subscribed, a small ad, and an email notification.

10. The method of claim 8, further comprising:
providing the user with real-time information by coupling a location-based service with the push proxy gateway.

11. The method of claim 7, wherein the plurality of protocol adapters include a Short Message Peer-to-Peer protocol (SMPP) protocol adapter, a Push Application Protocol (PAP) protocol adapter, a Multimedia Messaging Services (MM7) protocol adapter and an Internet Message Access Protocol (IMAP) protocol adapter.

12. The method of claim 7, wherein routing the push message from the application to the telecommunications network resource includes requesting by the application a notification from the gatekeeper, wherein the notification indicates whether the push message was sent, delivered, expired or canceled.

13. A non-transitory computer readable storage medium including instructions stored thereon which, when executed by a computer, cause the computer to perform the steps comprising:
providing a gatekeeper that implements SIP protocol and includes a policy engine, wherein the policy engine creates, customizes and executes one or more policies based on one or more service level agreements, wherein said policies indicate whether an application is permitted to use a telecommunications network resource;
receiving, by a push messaging protocol adapter, a push message from the application provided as part of an application tier, wherein the application tier includes a plurality of additional applications and a plurality of additional protocol adapters, wherein each of said protocol adapters accepts, from one of the plurality of applications, messages implementing a different protocol and converts each of said messages to the SIP protocol;

providing a messaging pipe that receives the push message from the push messaging protocol adapter and routes the push message to the telecommunications network resource implementing a push message protocol that will transmit the push message to a mobile device;

intercepting, via the gatekeeper, the push message and applying with the policy engine at least one said policy to the push message; and in response to applying with the policy engine said at least one policy to the push message, providing the push message to the resource interface that contains a plug-in manager and a plurality of instances of a push message plug-in, wherein the plug-in manager selects at least one of the plurality of instances of the push message plug-in to connect with the telecommunications network resource.

14. The non-transitory computer readable storage medium of claim 13, wherein the plurality of protocol adapters include a Short Message Peer-to-Peer protocol (SMPP) protocol adapter, a Push Application Protocol (PAP) protocol adapter, a Multimedia Messaging Services (MM7) protocol adapter and an Internet Message Access Protocol (IMAP) protocol adapter.

15. The non-transitory computer readable storage medium of claim 13, wherein routing the push message from the application to the telecommunications network resource includes requesting by the application a notification from the gatekeeper, wherein the notification indicates whether the push message was sent, delivered, expired or canceled.

* * * * *

UNITED STATES PATENT AND TRADEMARK OFFICE
CERTIFICATE OF CORRECTION

PATENT NO.        : 8,626,934 B2                                    Page 1 of 1
APPLICATION NO.   : 11/434024
DATED             : January 7, 2014
INVENTOR(S)       : Jakobsson et al.

It is certified that error appears in the above-identified patent and that said Letters Patent is hereby corrected as shown below:

On the Title Page, Item (56)

On page 2, column 1, under U.S. Patent Documents, line 19, Delete "Singhai et al." and insert -- Singhal et al. --, therefor.

On page 3, column 1, under Other Publications, line 7, delete "Microsystmes," and insert -- Microsystems, --, therefor.

In the Specification

In column 5, line 18, delete "delivery" and insert -- delivery. --, therefor.

In column 5, line 32, delete "messaging gateway" and insert -- messaging gateway. --, therefor.

Signed and Sealed this
Twenty-ninth Day of July, 2014

Michelle K. Lee
*Deputy Director of the United States Patent and Trademark Office*